Figures 1, 2:
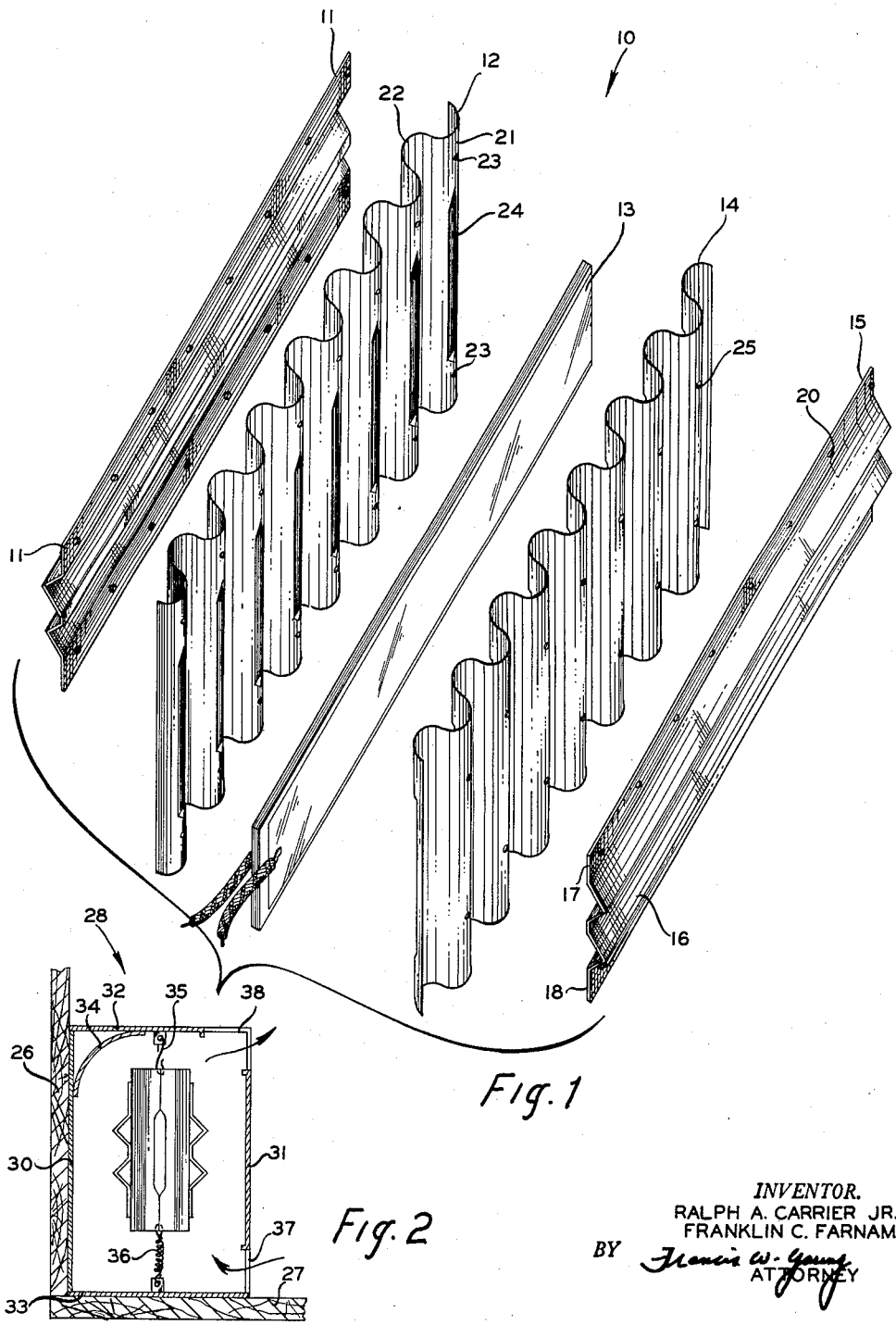

Jan. 3, 1961   R. A. CARRIER, JR., ET AL   2,967,225
ELECTRIC HEATER
Filed May 19, 1959

INVENTOR.
RALPH A. CARRIER JR.
FRANKLIN C. FARNAM
BY
ATTORNEY

United States Patent Office 2,967,225
Patented Jan. 3, 1961

2,967,225
ELECTRIC HEATER

Ralph A. Carrier, Jr., Gerton, and Franklin C. Farnam, Asheville, N.C., assignors to The Farnam Manufacturing Company, Incorporated, Asheville, N.C., a corporation of North Carolina Filed May 19, 1959, Ser. No. 814,274

2 Claims. (Cl. 219—34)

The present invention relates generally to electric heaters and more particularly to a unitary baseboard type heater assembly of improved construction.

Electrical baseboard heaters are becoming more and more desirable because of low installation costs and adaptability for independent and/or group temperature control. Moreover, heaters of the type under consideration may be added to existing building structures with substantially the same ease as in new constructions.

The instant heaters operate on the principle of induced draft, but of course could be used with the more commonly known forced air systems. These heaters are usually supported within a grill or housing having suitable apertures or openings to permit circulation of air therethrough and across a heating element. Air heated within the grill is permitted to rise and escape therefrom through exit openings, thereby simultaneously drawing fresh or cool air into the heating zone from another or supply opening. Operation of this type heating assembly per se of course is known and of itself forms no part of this invention.

The grill mentioned above usually consists of an L-shaped member in cross-section, having a somewhat horizontal top portion and a substantially vertical front portion which together cooperate respectively with the wall and floor of the room within which the heater is placed in order to enclose the electrical heater element. This invention of course is not limited in use to this specific grill construction and could be used with any of the alternative housings currently available.

The heating assemblies used heretofore have suffered from at least one primary disadvantage. The heating elements, which normally operate at high temperature, tend to damage the wall and floor members adjacent to which they are usually mounted. In order to obviate this difficulty, complicated baffle pieces placed between the heating element and the wall or floor are required. Use of these baffles increases the cost of the assembly not only from the standpoint of labor, but also with respect to materials. Additionally, overall heater efficiency is reduced because the baffles are provided for absorbing excess heat directed toward the wall or floor, and consequently do not dissipate heat directly into the room. Further, unless baffles are provided between the heating element and grill, the latter overheats and becomes a hazard, particularly if there are small children in the vicinity.

Moreover, heater assemblies such as described above not only are excessive in weight because of their undesirable construction, but are not sufficiently rigid or self-supporting to withstand the rough handling to which they are usually subjected. Inasmuch as heavyweight articles are slow to heat because of the mass, there is a considerable time delay involved before known heating assemblies create any noticeable change in room temperature. In addition, known heater assemblies do not lend themselves either to quick or easy installation, especially in view of the large number of pieces contained therein. For these and other reasons a suitable substitute for commercially available electric heating assemblies was desired.

A primary object of the present invention is to provide a heating assembly not having the disadvantages enumerated hereinabove.

Another object of this invention is to provide a heating assembly of unitary construction which can be readily installed without the use of additional baffle plates.

Still another object of the present invention is to provide an electric heating assembly which will dissipate heat rapidly.

A further object of this invention is to provide a heating assembly of unitary construction which is lightweight, economical to manufacture, easy to install, and efficient in operation.

An additional object of the present invention is to provide a rigid electric heating assembly wherein reinforcing members function also to reflect and localize heat.

A still further object of this invention is to provide a heating assembly of low mass which is particularly suited for instantaneous heating.

These objects may be accomplished in accordance with the present invention by forming a pair of elongated radiating fins, or radiators, in serpentine or zig-zag fashion, by interposing therebetween an elongated heating element, and by reinforcing the radiators with elongated, ribbed reflector plates placed on opposite sides of respective radiators from the heating element. Preferably, the inner risers of each radiator are recessed for receipt of the heating element.

Other objects and advantages will become apparent upon study of the following detailed explanation of one embodiment taken in conjunction with the accompanying drawings, wherein—

Figure 1 is a perspective view of a heating assembly in disassembled or exploded condition; and Figure 2 is an end elevation of the assembly shown in Figure 1, installed in operating position adjacent the baseboard of a room.

With attention now directed to Figure 1, it can be seen that the heating assembly 10 is formed from a first reinforcing reflector 11, a first radiator 12, heating element or heater 13, second radiator 14, and a second reinforcing reflector 15. The heating element 13 per se forms no part of this invention except in the novel combination and, accordingly, will not be described in detail herein. For a full description, attention is directed to U.S. Patent No. 2,870,277, dated January 20, 1959, and owned in common with this application. Suffice it to say that the heater 13 as shown comprises a heating coil (only the terminals of which are illustrated) embedded within or bonded to layers of reconstituted mica. Other types of heating elements conceivably could be utilized, but reconstituted mica is peculiarly adaptable because of the low mass and concomitant maximum dissipation of heat into the ambient atmosphere.

Although the reflectors and radiators could be formed from any high heat conducting metal or alloy, it is preferred that thin aluminum or copper sheets be used. Each of the reflectors 11 and 15 have been ribbed, as shown at 16, not only to contribute substantially to longitudinal strengthening of the assembly 10, but also to facilitate localization of heat within or between the radiators 12, 14. The ribs 16 may be formed by pressure rollers, or in any other suitable manner, and any convenient number may be provided on each reflector plate. The flange portions 17, 18 on each reflector (indicated only on reflector 15) lie in a common plane and are provided with apertures 20 which are spaced at predetermined distances throughout the length thereof. These apertures are used in the fabrication of the assembly 10, as will presently appear. It will be apparent that the triangular shaped ribs 16 could be rectangular in cross-section, or round, or any other suitable configuration.

The radiators 12, 14 are formed in serpentine fashion from elongated strips of aluminum or other material. This structure may resemble, for example, corrugated sheet metal generally used for roofing, which would have curved or rounded surfaces as shown, or it may be formed from interconnecting planar surfaces having a zig-zag shape in cross-section. The important feature here is that considerable surface area be available to radiate heat from element 13 for raising the ambient temperature, and other designs of course would be useful for this purpose.

The serpentine radiators 12, 14 may be divided into inner and outer surfaces having risers 21, 22, respectively, as shown in connection with radiator 12. Each inner riser 21 is provided with a pair of apertures 23, 23, to be used for mounting purposes, and a depressed or flattened portion 24. The latter portion may be formed by forcing intermediate sections of the risers outwardly, either during the formation of the radiator or afterwards. A series of depressions 24 in each radiator form a pocket or slot for housing one half of heater 13. The apertures 23 in inner risers 21 on each radiator cooperate in mounting the two radiators together with the heater snugly positioned therebetween in the pockets. This can be more clearly appreciated from a study of Figure 2.

The outer risers 22 on each radiator are also provided with apertures, as indicated at 25 on radiator 14. These apertures cooperate with openings 20 in flanges 17, 18 to secure the ribbed reflectors to the radiators, and vice versa. Although any suitable securing means could be used, such as spot welding, bolting, brazing, pinning with brads, etc., it has been found that the assembly can be held in position more economically by punching through adjacent sheets in such a manner that a burred surface results. A burr is produced in each sheet and these burrs grip one another sufficiently to insure assembly. Actually, therefore, the apertures 20, 23, and 25 are formed during the fabricating process, at least in the preferred embodiment, and not prior thereto.

It is felt that fabrication of the heating assembly described should be fairly obvious. For purposes of clarity, however, one satisfactory method will be summarized as follows. A pair of radiators are disposed adjacent one to the other with cooperating inner risers 21 aligned. A heating element is positioned between these radiators in the slot afforded by depressed portions 24. The radiators now may be secured, either by punching as preferred or by any of the other methods mentioned. The reinforcing plates or reflectors next may be positioned alongside the radiators, the flanges 17, 18 contacting outer risers thereof. These elements may now be secured by any of the means described.

With attention now directed to Figure 2, an actual heater installation will be described. In this figure, a vertical building wall is shown at 26 and a horizontal floor at 27. A grill 28 as shown consists of parallel, vertical baseboard and external walls 30, 31, respectively, a horizontal top 32, and a bottom 33. A deflector plate 34 promotes circulation of air in a vertically upward direction through the corrugations mentioned earlier.

The heating assembly 10 is suspended within grill 28 at each end by a hook 35 suitably attached to a lug on top 32 and to the radiators. A spring 36 anchored to the grill bottom 33 and to the radiators maintains the assembly suspended in predetermined spaced relationship with respect to the grill walls, top, and bottom, as shown.

Grill 28 is provided with a fresh or cool air entrance aperture 37 and a heated air outlet port 38. The hooks 35 and springs 36 support assembly 10 in a raised condition from the floor 27 to permit unopposed circulation of air through the grill, as indicated by arrows. Any suitable means (not illustrated) may be used for securing the grill to wall 26 or floor 27, if a more permanent mounting than that shown is necessary or desired.

As explained earlier, upon energization of heating element 13 through a suitable source of current, not illustrated, air within the compartment as shown in Figure 2, rises, passes over the heater and out through the upper port 38 in grill 28. This creates a draft, drawing more air into the compartment through the lower port 37. Heat from element 13 of course radiates in all directions. The reinforcing reflectors 11, 15, however, serve to deflect this heat inwardly of the assembly and in fact have been shown to reduce the baseboard temperature as much as 35% from that when using only radiators 12, 14. This prevents the baseboard or wall 26, as well as the floor 27, from overheating due to excess radiation, and this occurs without the use of additional baffle members such as described hereinabove. Since the heat is reflected back to the radiators, the entire assembly operates at a greater efficiency than heretofore possible.

It can be seen from the foregoing that the assembly 10 may be completely fabricated in the shop prior to installation. These heating devices may be constructed in various lengths from less than two feet up to about twelve feet without encountering difficulties. Moreover, although an assembly would normally be only a few inches in height, this of course may be varied to satisfy a wide range of conditions.

The assembly described herein has been found to have only about 20% of the weight of known assemblies. Moreover, the same may be manufactured at less cost than prior assemblies, and at a higher rate of production. Although the reflector plates 11, 15 of course could be flat rather than ribbed, it is apparent that the added strength afforded by the ribs is desirable, and can be obtained at only slight additional time or expense.

Inasmuch as the various elements forming the instant heater assembly preferably are constructed from thin, lightweight material, it can be seen that a still further advantage is afforded. These units have a very low mass; consequently, convected heat is obtained therefrom almost instantaneously. In contrast to this, known heaters having radial or spiral fins have a much higher mass and require considerably more time for initial heating, and are less efficient in dissipation of heat directly into the room. It can be seen that a saving in current results from this construction.

As mentioned previously, the type heaters to which this invention relates may be controlled automatically through thermostats or manually through rheostats. Individual room control is a great advantage, whether these heaters be used in homes, motels, or other type buildings. Elimination of baffles and other elements not required with the instant assembly does not detract from the versatility of this heating medium.

Inasmuch as various modifications will become apparent to those skilled in this art, it is intended that the scope of the present invention be limited only to the extent set forth in the following claims.

What is claimed is:

1. A baseboard type heating assembly formed from high heat conducting material having low mass, said assembly comprising a pair of elongated, corrugated radiators each having inner and outer risers, means for securing said radiators together with said inner risers lying in mutually facing relationship, means defining aligned recesses in each of said inner rises to form an opening extending longitudinally of said radiators, an electrical heater element removably positioned within said elongated reflector plate secured to the outer risers on respective radiators, means defining at least one rib on each reflector plate for strengthening the same longitudinally and for localizing heat emitted by said heater element, a grill having at least a top wall and a front wall, means for resiliently suspending said radiators on edge within said grill with the corrugations thereof extending vertically in spaced relationship with respect to said grill walls to induce circulation of air, means on said grill walls for introducing fresh air to the supported edge of said radiators, and means on said grill walls permitting rise of heated air across said heater element and said radiators for creating a draft.

2. A heating assembly as set forth in claim 1 in which the heater element is formed of reconstituted mica.

References Cited in the file of this patent

UNITED STATES PATENTS

| | | |
|---|---|---|
| 1,693,618 | Otis | Dec. 4, 1928 |
| 1,716,459 | Phelps et al. | June 11, 1929 |
| 1,731,472 | Murray | Oct. 15, 1929 |
| 1,823,993 | Stanford | Sept. 22, 1931 |
| 2,432,400 | Eger | Dec. 9, 1947 |
| 2,870,277 | Carter | Jan. 20, 1959 |
| 2,892,065 | Persak | June 23, 1959 |